Patented Nov. 15, 1938

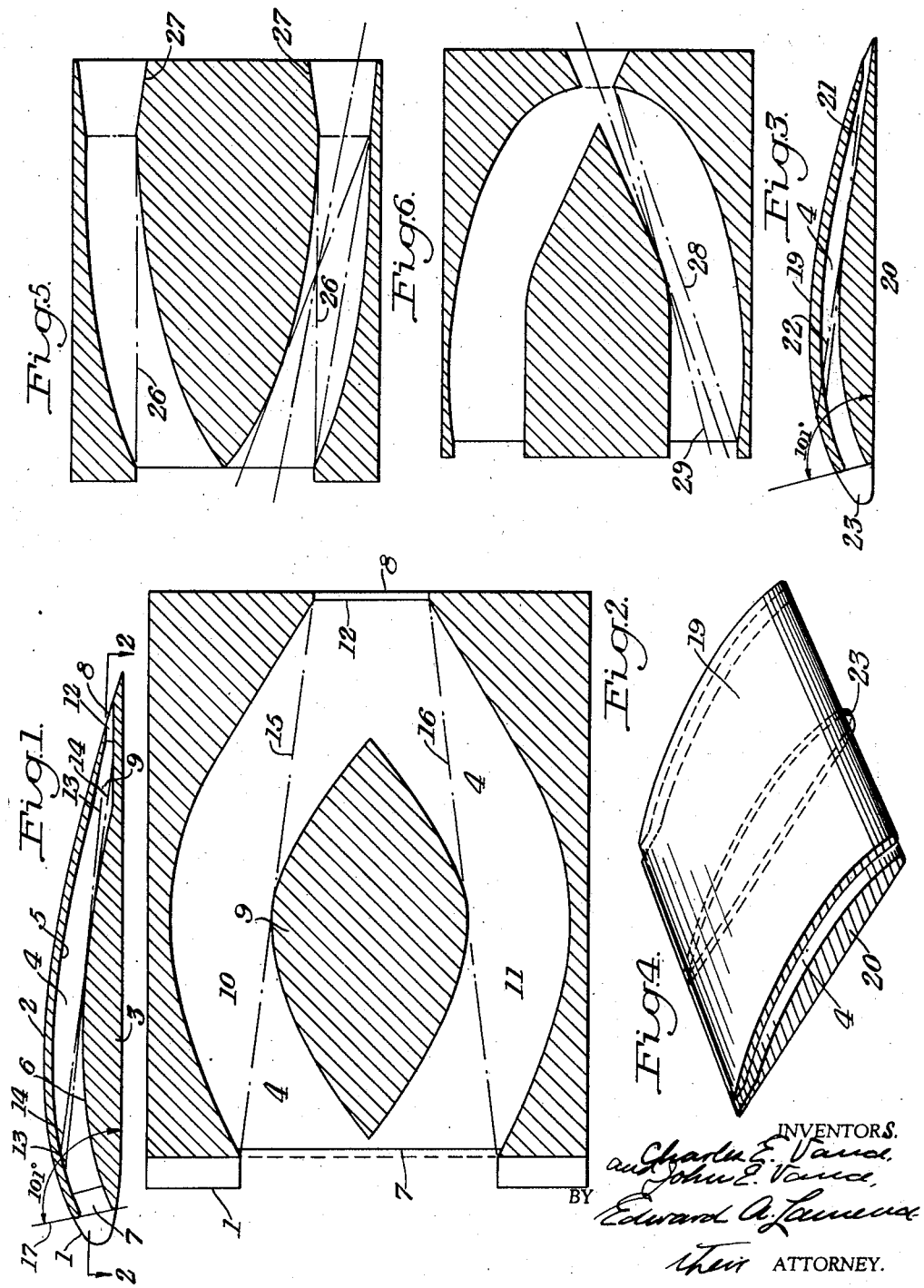

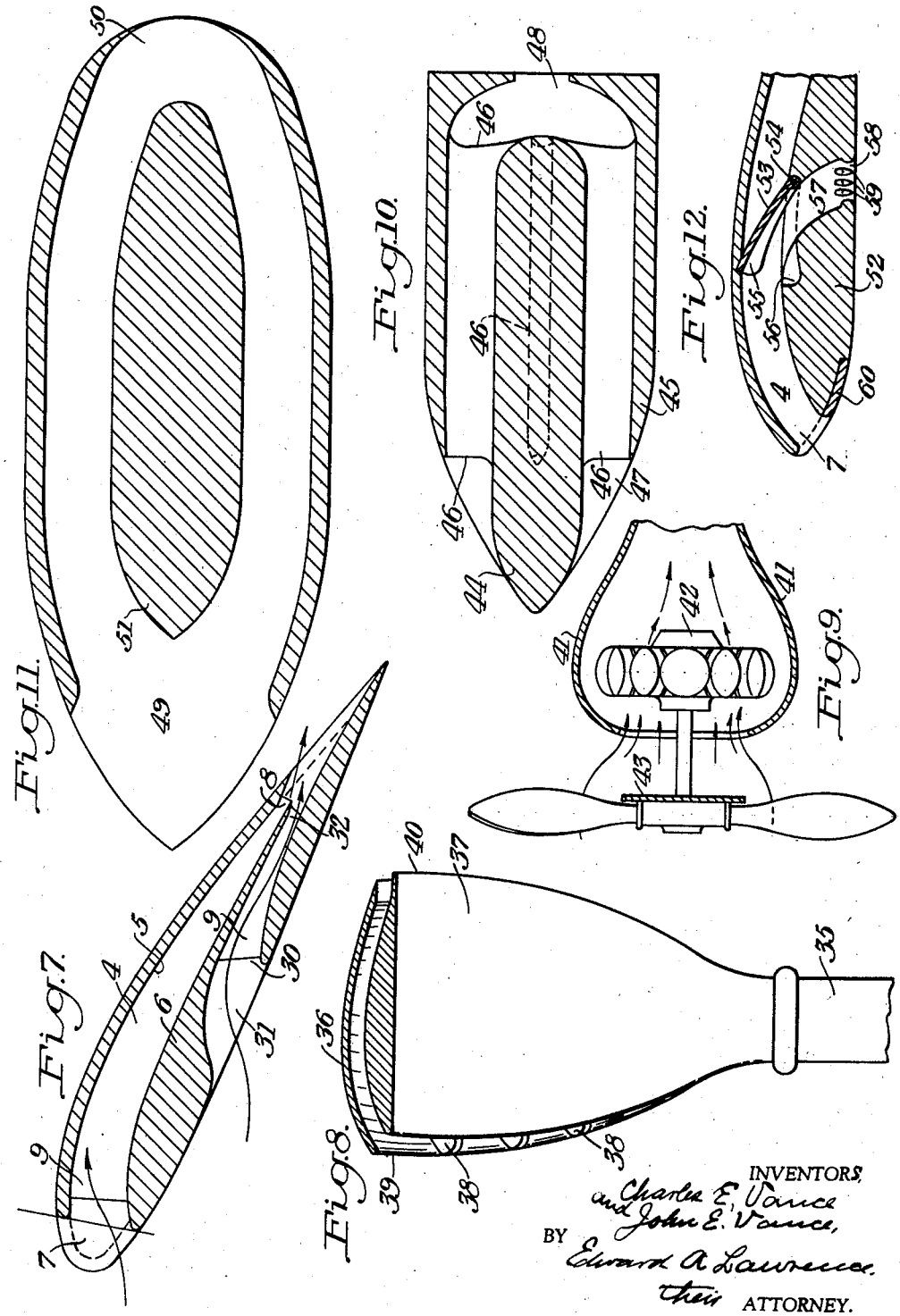

2,136,403

UNITED STATES PATENT OFFICE 2,136,403

MEANS FOR DEVELOPING REACTIVE FORCES

Charles E. Vance and John E. Vance, Pittsburgh, Pa.

Application November 27, 1935, Serial No. 51,789

10 Claims. (Cl. 244—130)

This invention relates generally to the relative travel of a fluid foil and a fluid medium by which the object is wholly or partially surrounded. By the generic term fluid foil we refer to a body having a surface designed to produce a dynamic reaction when projected through a fluid medium. When air is the fluid medium it may be termed an airfoil and when water is the fluid medium it may be termed a water foil.

While this invention is more particularly directed to aeronautics, it is with equal advantage applicable to the travel or flight of other aerial objects, such for instance as projectiles, and to objects wholly or partially immersed in water, such for instance as submarine vessels, torpedoes and surface vessels, and also to objects traveling along the surface of the ground, such for instance as railway vehicles and motor vehicles of all kinds. Again our invention is applicable to objects, such as windmills and water wheels wherein rotary movement about a more or less fixed axis is caused by the travel of the air or water.

It is an established fact that in the case of relative movement between an object and a fluid medium such as air or water, there is resistance, due to the viscosity and the mass of the medium, which counteracts the moving force. This resistance is generally termed "drag". There are two recognized elements comprising drag; profile and induced drag. Profile drag is the resistance encountered due to the viscosity of the fluid medium and is sometimes referred to as skin effect or skin resistance. Induced or dynamic drag is the resistance encountered due to the displacement of the mass of the fluid medium considering that the fluid has no viscosity.

Drag reduces the speed of relative travel obtainable from a given amount of energy, and thus to obtain a predetermined speed the expenditure of more energy is required to overcome such resistance.

To every action there is an equal opposite reaction, and in our invention we employ means to produce a reactive force which counteracts drag.

We accomplish the purpose in view by chambering the object and by the passage of the fluid medium thereinto, and discharge the fluid medium at increased velocity therefrom. The increased velocity of the fluid medium discharged creates a reactive force which acts against the body, and if properly regulated may be caused to reduce drag.

The discharge of the fluid at increased velocity is effected by restricting the chamber near or adjacent its rearward end. By so restricting the flow of the fluid, the mass thereof will create an equal and opposite reactive force to that required to move the fluid through the restriction thereby causing the fluid to flow through the orifice at an increased velocity. Thus the energy expended to increase the velocity of the fluid through the restriction or orifice develops an equal and opposite reactive force which is directed straight back through the flow of the liquid from the orifice area.

If the direction of this reactive force leads it out the front opening of the chamber it will be lost. We therefore provide a turn or bend in the chamber so that the reactive force is expended on the body or object itself.

This reactive force is created at the orifice by the increased velocity of the fluid as one body and is impinged on the object as the other body which results in the utilization of the energy developed.

The fluid discharge at increased velocity is impinged against the fluid medium in back of the object producing a second reactive force owing to the relative difference in the velocity of the two fluid bodies. This reactive force may be termed the secondary reactive force to distinguish from the primary reactive force above referred to. This secondary reactive force may also be used to an advantage in reducing drag in the same manner.

By regulating the size of the discharge orifice the energy required to produce the increased velocity of the fluid may be controlled, which effects the control of the reactive force developed.

Considering the opening of the chamber as one orifice and the restriction as the other orifice the ratio of the areas of said orifices will vary in proportion to the viscosity of the fluid mediums. To obtain the best operating characteristics of the chamber it has been determined by experiment that the ratios of seven to one and four to one are most effective for air and fresh water respectively.

In the case of an airship or airplane, we chamber the airfoils, such as the fuselage and other portions of the airplane in connection with which drag is produced during flight, admitting the air at the leading surfaces or edges and discharging the air at the trailing surfaces or edges, and by a restriction within the chamber we increase the velocity of the discharge. This air discharged at increased velocity develops the primary and secondary reactive forces above referred to, which forces are impinged upon and utilized by the airfoil.

These reactive forces may thus be made effective in opposing the drag. Thus by regulating the amount of these reactive forces, the effect of the drag on the airfoil may be reduced.

By changing the direction of the application of these reactive forces, so that they are inclined upwardly from the horizontal, their effect may be divided into two components, one being horizontal and effective against drag and the other being vertical and effective to produce lift.

Again a vertical resultant reactive force may be developed to produce lift alone and permit the reaction of drag to act on the airfoil.

It is obvious that the above applies also to other aerial objects, such as projectiles in flight.

In the case of propellers, such as those used to drive aerial or water vessels, the inlet of the chambers is on the leading edge of the blade and the discharge at the trailing edge.

In the case of windmills or water wheels where the travel of the fluid medium rotates the wheel, the chambering of the blades is similar to that of propeller blades.

In the case of surface vessels in water and land vehicles, the reactive force is effective horizontally to reduce the energy required for driving. These reactive forces may also be applied to increase or decrease the effective weight of the vehicle.

In the case of submarine vessels the direction in which the reactive force is effective may be varied, whereby to not only reduce the effect of drag but also to assist, by its vertical component, in either raising or lowering the vessel.

In the accompanying drawings, wherein we have illustrated practical embodiments of the principles of our invention, Fig. 1 is a vertical section of the wing or airfoil of an airplane.

Fig. 2 is a horizontal section taken on the line 2—2 in Fig. 1.

Fig. 3 is a view similar to Fig. 1 but showing an air foil of different design.

Fig. 4 is a view in perspective of the airfoil shown in Fig. 3.

Fig. 5 is a view similar to that in Fig. 2 but showing a modified form of chambering.

Fig. 6 is a similar view showing another modification.

Fig. 7 is a view similar to Fig. 1 showing a form of chambering used with the airfoil materially inclined to overcome induced drag.

Fig. 8 is a broken perspective of a propeller blade to which our invention is applied.

Fig. 9 is a sectional view illustrating the application of the invention to an airplane or other motor.

Fig. 10 is a longitudinal section of a projectile showing the application of our invention.

Fig. 11 is a view in horizontal section showing the application to a water vessel.

Fig. 12 is a sectional view of an airfoil showing means for mechanically changing the resultant force to produce an increase in lift.

Referring particularly to Figs. 1 and 2 of the drawings, 1 represents a wing portion or airfoil of an airplane having the upper cambered surface 2 and the lower chord surface 3.

Within the airfoil we provide the reactive impeller chamber 4, the upper and lower surfaces of which are cambered as at 5 and 6. This chamber is provided with a leading orifice or opening 7 at the front edge of the airfoil and with a trailing or discharge orifice 8 at the rear edge of the airfoil.

9 represents a stream line baffle construction which divides the chamber 4 into the two passageways 10 and 11. The cross sectional area of the leading orifice 7 is larger than that of the trailing orifice 8 and the passageways 10 and 11 are so constructed between the cambered surfaces 5 and 6 and the baffle 9 that they collectively maintain the same cross sectional area of the leading orifice 7 along the chamber to the orifice 12 or the front edge of the trailing opening 8.

In effect we have provided an air passageway through the wing structure from the leading edge to the trailing edge with a restricted orifice.

The air flows into this passageway and through the chamber 4 at a retarded velocity relative to the velocity of the airfoil and the medium. The velocity of the air within the chamber undergoes a gradient change from the opening 7 to the orifice 12. This retarded velocity is determined by the building up of the reactive force at the orifice 12 to counteract the drag force.

The ratio of the areas of the orifices is not a direct proportion of the velocity of the fluid flowing through the chamber, however this ratio does regulate the forces created thereby, to counteract drag by an opposite force.

Again the relative size of the leading orifice is determined by the design of the airfoil.

Thus the air entering the orifice of the chamber 4 is retarded in the passageways 10 and 11 and is forced through the leading edge 12 of the orifice 8 by means of the relative movement between the airfoil and the air, which relative movement is created by the power expended in rotating a propeller or other mode of driving the object together with any power gained by the action of a headwind on the airfoil.

This expenditure of energy causes the air to pass to and through the trailing orifice which sets up a reactive force first due to the acceleration of the air at the orifice and second to the relative difference in the velocity of the air discharged and that flowing over the airfoil.

It will be observed that such reactive forces will be directed back along the line of discharge into the chamber and will pass directly therethrough if the chamber 4 were straight and thus be wasted. To utilize this reactive force we provide a reactive surface against which it impinges and is expended to move the airfoil or body in the same direction that it is traveling. Referring to Figs. 1 and 2, the effective reactive surfaces are created by the double camber of the chamber 4 and the baffle member 9. The construction lines 13 and 14 of Fig. 1 represent the limits between which an angular reactive force is effective from the orifice 12. Any reactive force traveling between these lines would strike the cambered surfaces within the chamber 4 and be expended. The rear surface of the baffle 9 also acts as a reactive surface as this baffle closes off any direct path between the two openings 7 and 8, as shown by the construction lines 15 and 16 in Fig. 2. If the chamber 4 were between chord surfaces instead of cambered surfaces this baffle would form substantially the total reactive surface against which the resultant reactive force would be expended.

If the resultant of this reactive force is horizontal its energy will be expended to drive the airfoil forward, thereby decreasing the drag, depending upon the amount of energy developed in the resultant reactive force. If the resultant reactive force is at a positive angle to the horizontal it may be divided into components, one horizontal and the other vertical. The horizontal component may be termed the "thrust" which counteracts the drag and the vertical component would be "lift" which aids the lift component of the normal resultant air force. Such a positive reactive force may be sufficient to reduce the drag of the airfoil and increase the lift at the same time.

These results have been proven by tests on an airfoil in a wind tunnel. From these tests it has been observed that a seven to one ratio of the areas of the leading and trailing orifices produces the best results for objects in air and a ratio of four to one for objects in fresh water. It is obvious that this orifice ratio will vary in relation to the viscosity of the ambient medium.

Another highly important factor is the consideration of the relative position of the trailing orifice with respect to the trailing edge of the airfoil. Theoretically this orifice should have no length whatsoever. However, this is impractical in the construction of an airfoil and it has been determined by test that favorable results are obtainable when this length is substantially a fraction of an inch.

The design of this reactive impeller chamber is of course as variable as the design of an airfoil itself. However another generality that we observed from our tests indicated that the plane of the leading orifice 7 should open at an angle of substantially one hundred and one degrees from the chord surface, as indicated by the construction line 17 for the type of airfoil indicated in Fig. 1. This angle produced the best results on this design of airfoil over a range of varying angular degrees of attack. But with various types of airfoils designed for specific conditions on different kinds of planes and for wings having various angles of attack the angular plane of the leading orifice must of course be changed to produce the best results.

It has also been determined by test that the area of the plane of the leading orifice should be substantially fifty percent or more of the total profile area at an angle of attack of zero degrees. This of course is also subject to variation with different designs of airfoil.

Not only should the discharge orifice be coincident with the trailing edge but it should also extend the full length of the span to obtain the best results. This may be accomplished by employing the structure shown in Figs. 3 and 4 wherein the reactive impeller chamber 4 is constructed by, in effect, superimposing one airfoil in close proximity to another and having their adjacent cambered surfaces produce, with one another, the proper orifice ratio and the proper reactive surface as explained above. Thus the upper airfoil 19 provides the camber of the wing and the upper surface of the reactive impeller chamber 4 whereas the lower airfoil provides the chord or under surface of the wing and the bottom of the chamber 4.

The construction lines 21 and 22 illustrate the limits in which the resultant reactive force is effective on the surfaces produced by the camber of these two airfoils.

These airfoils may be held in fixed relation by the properly contoured wing ribs 23.

Fig. 5 illustrates an airfoil structure wherein single leading and double trailing orifices are employed to form a reactive impeller chamber.

If the upper and lower walls of this chamber are not cambered the construction lines indicate the possible limits through which angular reactive forces may travel. However, a reactive force normal to the span of the airfoil will not pass beyond the limits indicated by the construction lines 26.

It will be noted that the surfaces of the rear orifices are flared as at 27 to produce an effective short length orifice. With a relatively long orifice it has been found advantageous to provide these flaring surfaces.

Fig. 6 illustrates an airfoil structure having a double leading orifice and a single trailing orifice. Again the construction lines 28 and 29 indicate the limits through which the angular reactive forces may be effective with flat instead of cambered chamber surfaces.

Each of these designs of airfoils have been found to produce a sufficient reactive force to reduce the drag thereof and produce an increased lift.

For angles of attack from ten to twenty degrees, where the induced drag increases, an increased reactive force may be obtained by providing a secondary reactive impelling chamber generally designated at 30 in Fig. 7. The leading orifice 31 is in the under surface of the airfoil and the trailing orifice 32, directly below the orifice 8. The discharge orifices of both chambers combine to form a single air flow at the trailing edge. At low angles of attack the primary chamber 4 is more effective than at high angles of attack. The converse is true of the secondary chamber 30.

It is evident that by the provision of a plurality of reactive impeller chambers an unlimited control may be had of the characteristics of an airfoil. It is also possible to control or direct the path of the discharging air flow from several chambers to create reactive forces simultaneously to effect desired results.

For example two reactive impeller chambers might be employed to discharge in spaced relation to provide angular reactive forces which converge to aid a main or intermediate reactive force from an intermediate chamber, or the spaced discharges might effect direction control, whereas the intermediate discharge would be utilized as an impelling force to counteract drag.

In Fig. 8 we have illustrated the application of our invention to a propeller blade constructed in the manner of an airfoil. The application of the invention in this view is similar to that shown in Figs. 3 and 4. 35 represents the hub, 36 the outer cambered member, 37 the inner cambered member and 38 the rib sections holding the blade sections in fixed relation. 39 is the leading edge and 40 the trailing edge which contain the leading and trailing orifices respectively with the discharge restriction being as close to the rear edge as possible.

This application of our invention has many advantages. It decreases the resistance drag of the blades and increases their lift or forward pull. With the variable pitch propeller the reactive impeller chamber may be made substantially as effective at one pitch as it is at another.

Our invention is also applicable to reduce the parasitic resistance created by other airfoil parts of the airplane other than the wings themselves. This includes the fuselage, the radiator, the wing bracing, the landing gear, the tail skid, the windshields, the motor and other items that go into the structure of an airplane. We have shown a motor as an example to illustrate the principles of our invention to overcome these parasitic resistances.

Referring to Fig. 9, 41 represents a cowl covering of the motor 42 which is also employed as a reactive impeller chamber. The front of the cowl represents the leading orifice and the rear the trailing or restricted orifice. Ahead of the leading orifice we provide a reactive surface or splash board 43 which is spaced sufficiently from the motor to permit sufficient passage of air through the cowl. The exhaust of the motor is also intended to be discharged from the rear orifice. The developed reactive force then acts upon the motor as a reactive surface or if it is not sufficient then on the splash board 43, thereby reducing or entirely eliminating the drag of this particular unit.

This principle is quite obviously the same as that applicable to the fuselage, radiators, etc. The struts for the wings and landing gear may be constructed in the manner of that of the airfoil shown herein.

Fig. 10 illustrates the principle of our invention as applied to such an airfoil as a projectile wherein 44 represents the explosive magazine proper and 45 the outer housing which provides the reactive impeller chamber and also shrapnel when the shell bursts. The shell and the casing are made integral by the web members 46. 47 and 48 represent the leading and trailing orifices respectively. Obviously this principle is applicable to torpedoes and submarines if the orifice ratio is arranged accordingly. Quite obviously this ratio for salt water will be less than that for fresh water owing to the viscosity of the two liquids.

Fig. 11 illustrates the application of this invention to a water foil such as a boat wherein 49 represents the leading orifice and 50 the trailing orifice. For fresh water the ratio of the areas of these orifices should be four to one. 51 represents the baffle reaction surface which makes effective the reaction force.

By suitable intake and outlet orifices part of the water that the bow of the boat contacts during its forward movement is admitted into and through the hull of the boat.

By accelerating this water through the restricted discharge orifice a reactive force is obtained as described above. The active force is representative of the volume of discharge at its momentum, while the reaction is a force that is effective on the reaction surface in the opposite direction to the resistance to movement of the boat.

The resistance area of the bow of the boat and the practical limit of the intake orifice which affects the intake volume of water must be designed within practical limits to obtain a sufficient buoyancy for the desired load carrying capacity of the boat. Within these limits we found by experiment that our invention will reduce the drag of a boat more than thirty percent. If a further reduction in the drag of the boat is desired with the load carrying capacity it is necessary to increase the length thereof within practical limits.

Referring now to Fig. 12, 52 represents an airfoil having the ordinary reactive chamber 4 which is provided in its unrestricted portion with a deflector or valve member 53 preferably hingedly attached to the bottom of the chamber 4 at 54. 55 represents a plurality of stiffening members or ribs integral with the valve for supporting the same.

When the valve 53 is in its horizontal position it fits within a pocket 56 in the lower section of the airfoil and its upper surface forms part of the cambered surface of the floor of the chamber 4. When the valve is in the position as shown in Fig. 12 it acts to deflect the air entering the chamber 4 into the sub-passageway 57, which directs the air down through the airfoil and discharges it through the orifice 58 at substantially right angles to the chord surface 3. 59 represents orifice deflector plates which are arranged to deflect the discharging air in either direction from the normal flow thereof. By changing the position of the effective discharge orifice we are enabled to change the application of the resultant force created thereby. Thus a leading, normal, or lagging positive or lift resultant reactive force may be developed to act upon the airfoil to produce the desired results.

The valve 53 and the deflector plates 59 may be controlled in any well known and expedient manner. A shutter 60 may be provided to close the leading orifice 7 to completely shut off the chamber 4 to eliminate the reactive principles of our invention and utilize the standard characteristics of the airfoil. This shutter is of course applicable to any of the other designs shown in the drawings.

By the sub-reactive chamber 57 we are enabled to adjust the discharging orifices to produce a resultant reactive force which will act in phase with the air forces acting upon the airfoil at the center of gravity and the center of pressure thereof. It may also be utilized to maintain stability of the airfoil by maintaining the effective center of pressure in phase with the center of gravity. Further by changing the position of the sub-reactive discharge orifice or orifices along the span of the airfoil more accurate control of the center of pressure may be had along the airfoil.

When taking off the sub-reactive chamber 57 may be opened to produce greater lift at slower speeds. The discharge of the air from the orifice 58 not only produces a positive lift but also provides increased pressure under the airfoil which accentuates the normal characteristics thereof. When proper elevation and speed are obtained then the valve 53 may be lowered to the position shown in dotted lines, causing the impeller reactive chamber 4 to be effective in overcoming drag and producing the lift desired at high speeds.

With slight variations the impeller chamber 4 and the sub-chamber 57 may be made independent from one another and operated with individual controls.

From the above disclosure it is evident that the speed of an object such as an airplane may be increased with a saving of energy over that of the present planes. This saving of power is produced by the development of a thrust by means of the impeller reactive chamber which is applicable to the airfoils or control surfaces as well as those parts of an airplane that are necessary yet produce a major portion of the drag.

Lift alone may also be produced by this resultant reactive force which represents a further saving in energy.

Again we have shown the application of increasing drag and producing lift at the same time which aids in retarding the motion of an airplane for landing, thus requiring shorter landing space.

The application of producing lift and decreasing or eliminating drag simultaneously permits an airplane to take off with less speed and energy and at higher take off angles.

Likewise the cruising speed and performance may be controlled with increased accuracy at varied angles of attack.

Obviously the operations of these reactive chambers may be controlled by air speed in conjunction with motor speed automatically by mechanisms and circuits already known to the art.

While we have shown and described a present preferred embodiment of our invention, it may be otherwise variously embodied within the scope thereof.

We claim:

1. In an airfoil the combination of means in said airfoil defining a chamber having an intake opening to admit air thereinto, and means defining a chamber discharge orifice the area of which is approximately one-fourth that of the intake opening, said discharge orifice being positioned relative to the intake opening to prevent a direct flow of air through said chamber.

2. In an airfoil the combination of means in said airfoil defining a chamber having an intake opening to admit air thereinto, and means defining a chamber discharge orifice the area of which is approximately one-fourth that of the intake opening, said discharge orifice being positioned relative to the intake opening to prevent a direct flow of air through the chamber and to direct air horizontally to produce a reactive force counteracting the drag of the airfoil.

3. In an airfoil the combination of means in said airfoil defining a chamber having an intake opening to admit air thereinto, and means defining a chamber discharge orifice the area of which is approximately one-fourth that of the intake opening, said discharge orifice being positioned relative to the intake opening to prevent a direct flow of air through the chamber and to direct the air downwardly to produce a reactive force increasing the lift of the airfoil.

4. In an airfoil the combination of means in said airfoil defining a chamber having an intake opening to admit air thereinto, and means defining a chamber discharge orifice the area of which is approximately one-fourth that of the intake opening, said discharge orifice being positioned relative to the intake opening to prevent a direct flow of air through the chamber and to direct the flow of the air discharged from the chamber to produce a reactive force increasing the lift and counteracting the drag of the airfoil.

5. In an airfoil the combination of means in said airfoil defining a chamber having an intake opening to admit air thereinto, the plane of said opening being substantially normal to the line of flight of said airfoil, and means defining an orifice for discharging air from said chamber parallel with the line of flight to produce a reactive force counteracting the drag of the airfoil, said orifice being from one-fourth to one-seventh of the area of the intake opening and being positioned relative to the intake opening to prevent a direct flow of air through the chamber.

6. In an airfoil the combination of means in said airfoil defining a chamber having an intake opening to admit air thereinto, the plane of said opening being substantially normal to the line of flight of said airfoil, and means defining an orifice for discharging air from said chamber parallel to the chord of the airfoil to produce a reactive force increasing the lift and counteracting the drag of the airfoil, said orifice being from one-fourth to one-seventh of the intake opening area and being positioned relative to the intake opening to prevent a direct flow of air through the chamber.

7. An airfoil structure designed to increase lift and reduce drag which comprises means defining a chamber in the airfoil having an inlet opening adjacent the leading edge to admit air thereinto and a restricted outlet opening adjacent the trailing edge for discharging air therefrom, and a reactive surface within said chamber opposite said outlet, said outlet being from one-fourth to one-seventh of the inlet opening area to produce a discharge of the air at increased velocity and creating a reactive force with said reactive surface to increase lift and reduce drag of said airfoil.

8. In an airfoil a combination of means defining a chamber having an inlet opening adjacent the leading edge to admit air thereinto and a restricted outlet opening adjacent the trailing edge for discharging air therefrom, said outlet being from one-fourth to one-seventh of the inlet opening area to produce a discharge of the air at increased velocity, said outlet being positioned relative to the inlet opening to prevent a direct flow of air through said chamber from the inlet opening.

9. In a fluid foil, the combination of means in said fluid foil defining a chamber the cross sectional area of which is uniform throughout its length, means defining an intake opening at the head of the fluid foil for admitting fluid to said chamber, means for changing the position of the intake opening relative to the fluid foil, and means defining an orifice of smaller cross sectional area than the intake opening for discharging fluid from the chamber, said discharge orifice being positioned relative to the intake opening to prevent a direct flow of fluid through said chamber.

10. In a fluid foil, the combination of means in said fluid foil defining a chamber the cross sectional area of which is uniform throughout its length, means defining an intake opening substantially the same cross sectional area as the chamber for admitting fluid thereinto, means defining an orifice of smaller cross sectional area than the intake opening for discharging fluid from said chamber, said discharge orifice being positioned relative to the intake opening to prevent a direct flow of fluid through said chamber, and means for changing the direction of the fluid discharge through the said orifice to change the direction of the resultant force created thereby.

CHARLES E. VANCE.
JOHN E. VANCE.